United States Patent [19]

Benson

[11] 4,205,704
[45] Jun. 3, 1980

[54] EXHAUST BRAKE VALVE

[75] Inventor: John Benson, Tigard, Oreg.

[73] Assignee: Dana Corporation, Toledo, Ohio

[21] Appl. No.: 948,415

[22] Filed: Oct. 4, 1978

[51] Int. Cl.² ............................................. F16K 3/02
[52] U.S. Cl. .............................. 137/630.12; 123/97 B;
188/273; 251/86; 251/326
[58] Field of Search ................. 123/97 B; 137/630.12,
137/630.14, 630.15; 188/273; 251/84, 85, 86,
326

[56] References Cited
U.S. PATENT DOCUMENTS

| | | | |
|---|---|---|---|
| 2,873,761 | 2/1959 | Tailleferre | 137/630.12 X |
| 3,933,339 | 1/1976 | Dietzsch | 251/86 X |
| 4,054,156 | 10/1977 | Benson | 137/630.12 |

FOREIGN PATENT DOCUMENTS 1501631  2/1978  United Kingdom .

Primary Examiner—Robert G. Nilson
Attorney, Agent, or Firm—Pearne, Gordon, Sessions, McCoy & Granger

[57] ABSTRACT

A brake exhaust valve having a primary gate driven in translation between open and closed positions by an actuator rod connected to the primary gate and a waste gate. The waste gate is rigidly connected to the actuator rod, and is arranged to unload pressure on the primary gate and develop impact energy before the primary gate is struck for reliability in opening and closing of the primary gate. A waste seal carried by the waste gate in a manner permitting it to float to a limited degree relative to the waste gate assures a positive seal with a waste port in the primary gate regardless of misalignment between the primary gate and actuator rod.

10 Claims, 4 Drawing Figures

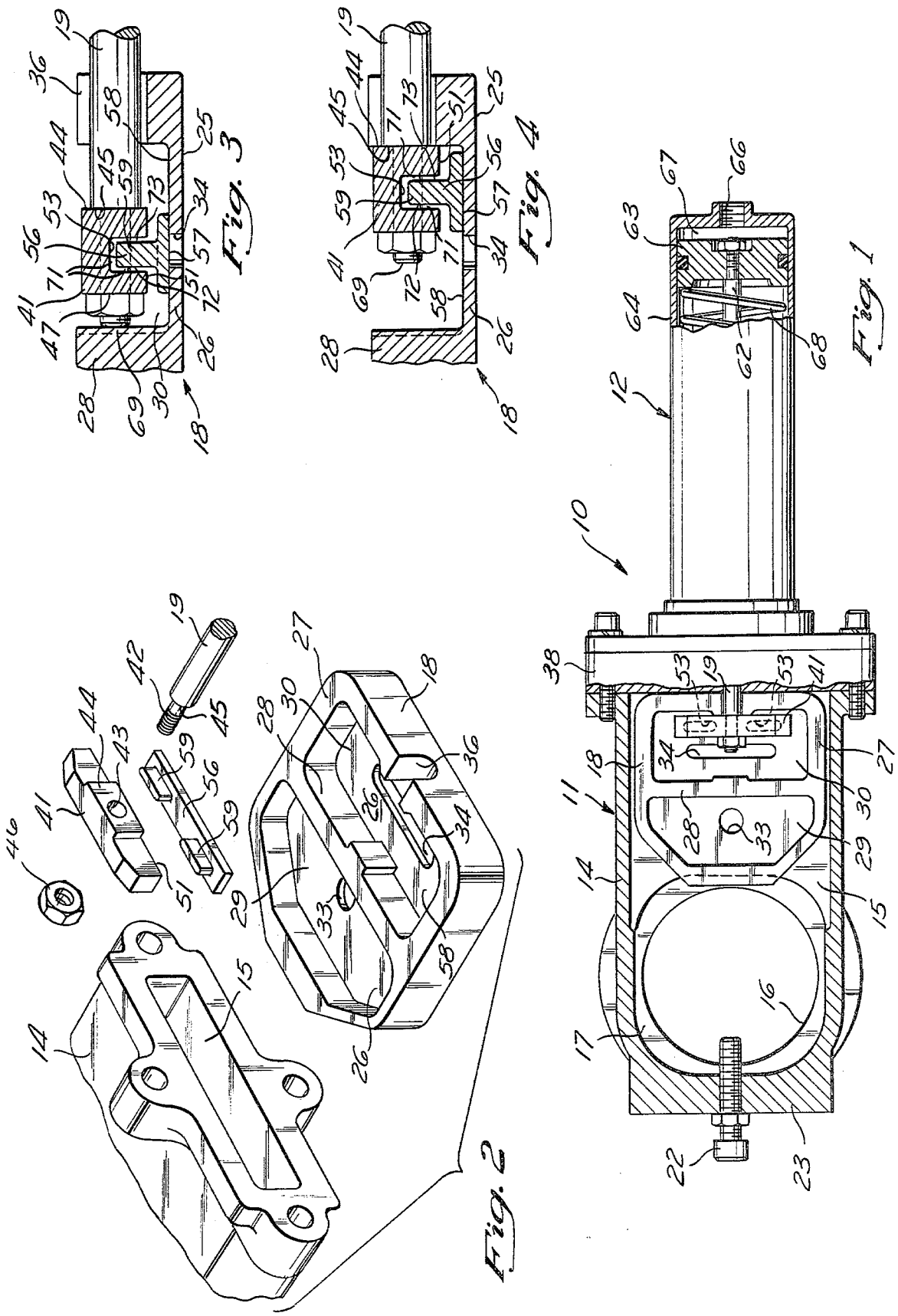

EXHAUST BRAKE VALVE

BACKGROUND OF THE INVENTION

The invention relates to improvements in an exhaust brake valves, in particular, to the type of such valves employing a translating gate for regulating gas flow.

PRIOR ART

My prior U.S. Pat. No. 4,054,156 and U.K. Pat. No. 1,501,631 disclose gate type valves for installation in the exhaust gas circuit of an internal combustion engine. In a motor vehicle, a brake valve by restricting exhaust gas flow when closed hinders rotation of the engine and, in turn, retards movement of the vehicle to assist or substitute for the operation of the vehicle's wheel brakes. The use of an exhaust brake thereby contributes to operational safety and extends the service life of the vehicle's wheel brakes. My prior invention disclosed in aforementioned U.S. Pat. No. 4,054,156 has overcome many problems associated with gate valves with respect to reliability and consistency of operation without compromising their recognized advantages over other valve designs. Gate valves, when compared to butterfly valves, for instance, do not obstruct gas flow when they are fully open, take us less space measured along the flow path of the exhaust circuit, and are self cleaning at their sealing surfaces.

In my aforementioned patent, I have disclosed a novel arrangement in which certain elements have been combined to provide a waste gate and a lost motion connection between the valve and an associated actuator to afford a higher degree of reliability and consistency in valve opening action. As taught in my aforementioned patent, the waste gate is effective in reducing pressure on the primary valve gate and the lost motion is effective in overcoming static friction of the primary gate on its seat.

SUMMARY OF THE INVENTION

The present invention provides an exhaust gate valve having a waste gate seal capable of limited movement with respect to its associated waste gate or carrier body enabling it to be self aligning to a waste port seat. The invention, in addition to affording both lost motion and waste gate action allows sufficient freedom of movement in the waste gate seal to permit the primary gate to float free of the actuator elements. More specifically, the degree and character of seal movement afforded by the invention is sufficient to permit the primary gate to be connected to an actuating rod with a slight degree of free movement for purposes of self alignment to its associated valve seat. Moreover, in accordance with the invention, the actuating forces existing between the actuator rod and primary gate are advantageously borne by the waste gate carrier body and are isolated from the waste gate seal. Isolation of the primary gate actuating forces from the waste gate sealing surfaces improves the performance of these latter elements and extends their service life.

In the disclosed embodiment of the invention, the primary gate is pan shaped and the waste gate and waste gate seal are disposed within the pan cavity of the primary gate. The actuating rod extends through a sidewall of the primary gate with its free end engaged with the waste gate. The waste gate is a generally bar shaped element extending transversely to the actuating rod. The bar-like waste gate is symmetrically arranged with respect to the axis of the actuating rod and includes a pair of recesses disposed on opposite sides of the rod. The recesses, which open towards a main end wall of the primary gate, receive complementarily shaped extensions of the waste gate seal. The waste gate seal is disposed between the waste gate body and main end wall of the primary gate. Engagement between the seal extensions and waste gate recesses provides a driving connection between the seal and waste gate which adjusts for any misalignment due to manufacturing tolerances, thermal distortion, and wear between the various elements and assures that a positive and reliable seal is maintained through an extended period of service.

BRIEF DESCRIPTION OF THE DRAWING

FIG. 1 is a cross sectional view of a brake valve constructed in accordance with the invention.

FIG. 2 is an exploded perspective view of various internal parts of the exhaust brake valve.

FIG. 3 is an enlarged fragmentary cross sectional view, in a plane perpendicular to the plane of FIG. 1, of a waste gate and seal in a closed position on the primary gate; and FIG. 4 is a view similar to FIG. 3 illustrating the waste gate and seal in an open position on the primary gate.

DESCRIPTION OF THE PREFERRED EMBODIMENT

Referring to the drawing, an exhaust brake assembly 10 includes a valve 11 and an actuator 12. The general construction of the assembly 10 with the exception of certain elements hereinafter described in detail, conforms to the disclosure of my aforementioned U.S. Pat. No. 4,054,156 incorporated herein by reference. The valve 11 includes a generally closed housing 14 adapted to be installed in series with the exhaust system of an internal combustion engine such that exhaust gases flow through a passage 16 of the housing. A planar valve seat 17 on the interior of the housing 14 surrounds the passage 16. A primary or main gate 18 actuated by an elongated rod 19 translates in a chamber 15 enclosed by the housing 14 between an open position illustrated in FIG. 1 and a closed position wherein it rests across the seat 17 to restrict exhaust gas passage through the housing and therefore retards rotation of an engine in a known manner.

With reference to FIG. 1, it will be understood that exhaust gas flow is into the plane of the drawing so that the pressure of exhaust gases forces the gate 18 against the seat 17. Where desired, an adjustable stop bolt 22 through an end wall 23 of the housing 14 is provided to limit travel of the primary gate 18 to less than that which would completely cover the seat 17.

The primary gate 18 is a generally planar pan-shaped structure having a planar main end wall 26 and an integral perpheral side wall 27. A planar surface 25 (FIGS. 3 and 4) of the end wall 26 seals the seat 17. An integral central web 28 extends between a pair of opposed portions of the side wall 27 and divides the space enclosed by the side wall 27 into two cavities 29 and 30. A circular aperture or vent 33 through the portion of the end wall 26 associated with the cavity 29 assures that even when the stop bolt or screw 22 is fully retracted and the primary gate 18 is fully extended across the seat 17 a minimum gas flow is permitted, for example, to maintain rotation of a turbocharger impeller.

A waste gate port 34 extends through a portion of the end wall 26 associated with the cavity 30. The port 34 is elongated in the plane of the end wall 26 in a direction perpendicular to the rod 19. The port 34 is centered laterally with respect to the actuating rod 19. A notch 36 is provided in the middle of one side of the side wall 27 for reception of the actuating rod 19 which extends through a suitable hole in an end plate closure 38 associated with the housing 14. The notch 36 has sufficient depth and width to provide clearance with the rod 19 and allow these elements to move relative to one another to a limited degree to avoid binding even where misalignment, thermal distortion, and like factors exist.

A waste gate 41 is rigidly secured to a free end 42 of the actuator rod 19. In the illustrated embodiment, the rod end 42 is of a reduced diameter and is externally threaded. The waste gate 41 which includes a bore 43 dimensioned to closely fit the reduced diameter end portion 42 of the rod, is fixed to the rod with its rear face 44 abutting against a radial shoulder 45 on the rod by a retainer nut 46 jammed against its forward face 47. The waste gate 41 has a generally bar-like configuration with the rod receiving bore 43 formed midway along its length so that, as indicated in FIG. 1, in the plane of the main gate 18 the waste gate is transverse to and symmetrically disposed on opposite sides of the rod 19. On a side 51 of the waste gate 41 facing the primary gate 18 are formed a pair of blind slots or recesses 53 extending into the waste gate. The slots 53 are elongated in the longitudinal direction of the waste gate 41 and are bilaterally symmetrically arranged with respect to the rod 19 when viewed in a plane parallel to the plane of the primary gate 18.

As indicated in FIGS. 3 and 4, a waste gate seal 56 is assembled and captured between the waste gate 41 and end wall 26 of the main gate 18 in the cavity 30 with a sealing face 57 in sliding engagement with a surface 58 of the end wall 26. The seal 56 is a generally rectangular flat body having a pair of integral tabs 59 extending perpendicularly to the seal body. The tabs 59 each extend longitudinally of the seal body 56 and are shaped and spaced in complementary relation to the slots 53 in the waste gate body 41 and thereby allow the waste gate to carry the seal with it in movement relative to the main gate 18. In assembly, each of the tabs 59 extend into corresponding ones of the slots 53 to provide means of operationally connecting the seal 56 to the waste gate 41. The surface 57 of the seal 56 in contact with the main gate surface 58 is somewhat larger, both in width and length, than the corresponding dimensions of the port 34 enabling it to both slide over the port and seal the same. Like the primary gate 18, the waste gate seal 56 is held against the associated surface 58 by pressure in the housing 14.

A remote end 62 of the actuating rod 19 is attached to a piston 63 disposed within a cylinder 64 of the actuator 12. In the illustrated embodiment, the actuator 12 is of the single acting type where the rod 19 is extended by admitting pressurized fluid through a port 66 into a chamber 67. The piston 63 and rod 19 are retracted by exhausting the port 66 and chamber 67 to allow a compression spring 68 to return these elements to the position illustrated in FIG. 1.

Driven by the rod 19, the waste gate 41 and main gate 18 are selectively opened and closed to pass or restrict gas flow through the passage 16. With the chamber 67 pressurized, initial movement of the rod 19 from the position of FIG. 1 causes the waste gate 41 and seal 56 to slide leftwardly to close the port 34. When an end face 69 of the rod 19 contacts the main gate web 28, the main gate 18 is driven leftwardly as viewed in FIG. 1 and relative motion of the waste gate 41 and seal 56 to the main gate stop. Motion of the main and waste gates 18 and 41 continues until an adjacent portion of the gate side wall 27 engages the stop screw 22 or associated wall 23 of the housing 14 whereupon flow through the passage 16 is restricted. With the passage 16 thus restricted, exhaust gas pressure increases and holds the main gate 18 tightly against the seat 17 and, similarly, the waste gate seal 56 against the surface 58.

To reliably open the main gate 18, the waste gate 41 and seal 56 perform the functions of reducing the pressure differential across the main gate 18 and developing a suitable impact opening force upon the main gate. Reduction of the differential pressure is accomplished during initial rightward movement of the waste gate seal 56 from a position covering the waste port 34. Shortly after uncovering the port 34, the waste gate 41 strikes the adjacent portion of the main gate sidewall 27. Sufficient momentum and impact energy are developed in the waste gate 41 and actuator 12 during their lost motion between engagement with opposite surface of the web 28 and side wall 27 of the main gate 18 to ensure that static frictional forces between the main gate and seat 17 are reliably overcome. The waste seal tabs 59 are dimensioned with respect to the waste gate recesses 53 to provide a clearance fit and thereby permit, to a limited extent, full freedom of movement of the seal with respect to the waste gate. This freedom of movement allows the seal 56 to reliably and consistently seat on the main gate surface 58 despite any relative movement of the main gate 18 relative to the actuating rod 19 and waste gate 41 both within and out of the plane of the main gate. Such clearance between the seal 56 and body 41 is indicated at 71 in FIGS. 3 and 4. FIGS. 3 and 4 also indicate the closed and open positions, respectively, of the seal on the waste port. The height of the tabs 59 extending from the plane of the seal 56 and length of such tabs in the direction transverse to the actuating rod 19 as well as the complimentary surfaces of the recesses 53 is such that the nominal combined bearing areas of either forward faces 72 or rearward faces 73 of such tabs are at least as large as the diameter of the actuating rod. This assures that an extended service life for both the seal 56 and gate 41 results despite any impact loading between these elements as a result of the opening and closing shifting of these elements. Impact forces in opening and closing the main gate 18 are borne by the rod 19 or waste gate 41 which is rigidly secured to the rod. These forces are thereby isolated from the seal 56. The restraint on the waste gate 41 imposed by the jam nut 46, opposing shoulder 45 and close fit between the waste gate bore 43 and rod end 42 ensures that excessive strains and impacts are not imposed on these elements when the valve is actuated.

Although the preferred embodiment of this invention has been shown and described, it should be understood that various modifications and rearrangements of the parts may be resorted to without departing from the scope of the invention as disclosed and claimed herein.

What is claimed is:

1. A brake valve comprising a housing adapted to be connected in series with the exhaust gas circuit of an internal combustion engine for purposes of retarding rotation of the engine, the housing enclosing a chamber and having a passage for conducting gas through said chamber, a generally planar valve seat within said housing encircling said passage, a primary gate disposed within said chamber, said primary gate including a generally planar wall including a face having a planar sealing surface, said primary gate being arranged to translate within said chamber between an open position wherein it is substantially free of restriction of said passage and a closed position wherein it engages said seat to restrict flow of exhaust gases through said passage, a waste gate port through said primary gate, a piston and cylinder actuator assembled with said housing externally of said chamber, said piston and cylinder actuator including a piston rod extending parallel to said planar seat and having a portion thereof extending into said chamber and connected to said primary gate to move said primary gate between said open and closed positions, a waste gate carried by said piston rod portion, said waste gate being arranged to selectively close or open said waste port by movement in a plane parallel to the plane of said seat in response to limited initial movement of said rod relative to said primary gate, means limiting relative movement between said piston rod and said gate to a fraction of the distance between said open and closed positions, said waste gate being rigidly fixed to said piston rod portion, waste gate seal means carried on said waste gate, said waste gate seal means being carried on said waste gate in a manner which permits relative movement between said seal means and said waste gate in a direction normal to the plane of said primary gate.

2. A brake valve as set forth in claim 1 wherein said piston rod and primary gate are constructed and arranged to permit a limited degree of relative movement between said rod and said primary gate in a direction normal to the plane of said seat.

3. A brake valve as set forth in claim 2 wherein said waste gate port comprises an elongated slot extending transversely to said piston rod.

4. A brake valve as set forth in claim 3 wherein said waste gate has a bar-like structure transversely symmetrically arranged on said rod, said seal means being a generally flat element disposed between said waste gate and said waste gate port.

5. A brake valve as set forth in claim 4 including means extending between said waste gate and said seal means for connecting said seal means to said waste gate which allows limited freedom of movement between said waste gate and said seal means to permit said seal means to seat on said primary gate regardless of misalignment between said primary gate and said waste gate.

6. A brake valve as set forth in claim 5 wherein said connecting means includes elements bilaterally symmentrically spaced on opposite sides of said piston rod in a plane parallel to the plane of said primary gate.

7. A brake valve as set forth in claim 6 wherein said connecting means and said seal means are arranged to permit exhaust gases to press said seal means against said primary gate.

8. An exhaust brake valve comprising a housing adapted to be connected in series with the exhaust gas circuit of an internal combustion engine for purposes of retarding rotation of the engine, the housing enclosing a chamber and having a passage for conducting exhaust gas through the chamber, a generally planar valve seat within said housing encircling said passage, a primary gate disposed within said chamber, said primary gate having a flat pan shaped configuration including an end wall and side wall portions defining a cavity, one side of said end wall including a planar surface arranged to seat against said valve seat, said primary gate being translatable between an open position laterally spaced from said seat and a closed position on said seat wherein it restricts gas flow through said passage, a piston and cylinder actuator adjacent said housing for displacing said primary gate between said open and closed positions, said actuator including a piston rod extending into said chamber and through a clearance aperture in an adjacent area of said side wall portion of said primary gate, a free end of said rod terminating in said cavity, a waste port through said end wall, a waste gate rigidly secured to said piston rod end, said waste gate having a bar-like configuration and extending transversely to said piston rod, said waste gate being substantially fully contained in said cavity, a waste gate seal disposed between said end wall and said waste gate, said waste gate seal having a generally flat body larger in width and length than said waste port, means connecting said waste gate and seal together, said piston rod, waste gate and seal being translatable relative to said side wall a limited distance during initial movement thereof in motion of said rod to close or open said primary gate, said connecting means permitting said seal limited freedom of movment relative to said primary gate to allow said seal to self align itself to said primary gate despite misalignment of said rod relative to said primary gate.

9. A brake valve as set forth in claim 8 wherein said connecting means includes recess means in one of said waste gate and seal members and extension means fixed to the other of said members and received in said recess means.

10. A brake valve as set forth in claim 9 wherein said recess means comprises a pair of recesses in said waste gate bilaterally symmentrically arranged on opposite sides of said piston rod, said seal including said extension means in the form of a pair of spaced integral extensions having a shape complementary to said recesses.

* * * * *